United States Patent
Fuller et al.

(10) Patent No.: US 12,113,369 B2
(45) Date of Patent: Oct. 8, 2024

(54) DEVICE FOR PROVIDING WIRELESS ENERGY TRANSFER

(71) Applicant: UTC Fire & Security Corporation, Farmington, CT (US)

(72) Inventors: Christopher C. Fuller, Bloomington, MN (US); Edward Goff, Mahtomedi, MN (US)

(73) Assignee: UTC Fire & Security Corporation, Farmington, CT (US)

(*) Notice: Subject to any disclaimer, the term of this patent is extended or adjusted under 35 U.S.C. 154(b) by 110 days.

(21) Appl. No.: 17/882,791

(22) Filed: Aug. 8, 2022

(65) Prior Publication Data
US 2023/0187974 A1 Jun. 15, 2023

Related U.S. Application Data

(62) Division of application No. 15/517,748, filed as application No. PCT/US2015/044822 on Aug. 12, 2015, now Pat. No. 11,411,439.

(Continued)

(51) Int. Cl.
*H02J 50/23* (2016.01)
*H01Q 7/00* (2006.01)
(Continued)

(52) U.S. Cl.
CPC .............. *H02J 50/23* (2016.02); *H01Q 7/00* (2013.01); *H01Q 11/08* (2013.01); *H01Q 15/02* (2013.01); *H01Q 19/06* (2013.01); *H01Q 19/062* (2013.01); *H02J 50/27* (2016.02); *H02J 50/70* (2016.02); *H01Q 17/00* (2013.01)

(58) Field of Classification Search
CPC ...................................................... H02J 50/27
See application file for complete search history.

(56) References Cited

U.S. PATENT DOCUMENTS 6,275,143 B1   8/2001  Stobbe
7,443,057 B2  10/2008  Nunally
(Continued)

FOREIGN PATENT DOCUMENTS

WO  WO-2001037374 A1   5/2001
WO  WO-2008078251 A1   7/2008
WO  WO-2012148450 A1  11/2012

OTHER PUBLICATIONS

M. Yamakawa et al.: "Wireless Power Transmission into a Space Enclosed by Metal Walls Using Magnetic Resonance Coupling," Wireless Engineering and Technology, Jan. 2014, 5, pp. 19-24.

(Continued)

*Primary Examiner* — Daniel Kessie
(74) *Attorney, Agent, or Firm* — Locke Lord LLP; Scott D. Wofsy; Gabrielle L. Gelozin

(57) ABSTRACT

A system for providing wireless power transfer includes a primary antenna having a primary lens surrounding the primary antenna and a secondary antenna having a secondary lens surrounding the secondary antenna. The secondary antenna is operatively connected to power at least one sensor. A mains power source is operatively connected to power the primary antenna. The primary and secondary antennas are separated a distance apart to wirelessly transfer power from the primary antenna to the secondary antenna.

10 Claims, 5 Drawing Sheets

Related U.S. Application Data

(60) Provisional application No. 62/061,905, filed on Oct. 9, 2014.

(51) Int. Cl.
| | | |
|---|---|---|
| *H01Q 11/08* | (2006.01) | |
| *H01Q 15/02* | (2006.01) | |
| *H01Q 19/06* | (2006.01) | |
| *H02J 50/27* | (2016.01) | |
| *H02J 50/70* | (2016.01) | |
| *H01Q 17/00* | (2006.01) | |

(56) References Cited

U.S. PATENT DOCUMENTS

| | | | |
|---|---|---|---|
| 7,928,900 | B2 | 4/2011 | Fuller et al. |
| 8,594,572 | B1 | 11/2013 | Ortiz et al. |
| 2008/0054638 | A1 | 3/2008 | Greene et al. |
| 2009/0135086 | A1 | 5/2009 | Fuller et al. |
| 2012/0080956 | A1 | 4/2012 | Wang et al. |
| 2012/0228563 | A1 | 9/2012 | Fuller et al. |
| 2012/0274147 | A1 | 11/2012 | Stecher et al. |
| 2013/0052947 | A1* | 2/2013 | Kole ............... H04B 5/0031 455/41.1 |
| 2015/0028687 | A1 | 1/2015 | Ichikawa et al. |

OTHER PUBLICATIONS

L. Xie et al.: "Wireless Power Transfer and Applications to Sensor Networks," Virginia Polytechnic Institute and State University, no date specified, pp. 1-12.

K. M. Z. Shams et al.: "Wireless Power Transmission into a Buried Sensor in Concrete," IEEE Sensors Journal, vol. 7, No. 12, Dec. 2007, pp. 1573-1577.

J. U. M. Araiza: "Wireless Transmission of Power for Sensors in Context Aware Spaces," Submitted to the Program in Media Arts and Sciences, School of Architecture and Planning; MIT; B.S. Telecommunications Engineering National Autonomous University of Mexico, May 10, 2002, pp. 1-120.

N. Srivastava et al.: "Wireless Power Transmission to Sensors Using Mobile Carrier Hosts," Dept. of Electronics Engineering, Bharati Vidyapeeth Deemed University, Pune, India, Special Issue of Ijsdge, ISSN No. 2315-4721, vol. 2, Nos. 1-1, 2, 2013, pp. 138-142.

Jona, O., et al., "Wireless Power Transmission to Sensors Embedded in Concrete Via Magnetic Resonance", Dept. of Electr. & Comput. Eng., Fla Int. Univ., Miami, FL.

B. Griffin et al.: "Resonant Wireless Power Transfer to Ground Sensors from a UAV," 2012 IEEE International Conference on Robotics and Automation, University of Nebraska-Lincoln—CSE Conference and Workshop Papers, May 14-18, 2012, pp. 1-7.

S. Jiang: "Optimum Wireless Power Transmission for Sensors Embedded in Concrete," Florida International University—FIU Electronic Theses and Dissertations, University Graduate School, Nov. 3, 2011, pp. 1-136.

Dr. M. Kesler: "Highly Resonant Wireless Power Transfer: Safe, Efficient, and over Distance," © WiTricity Corporation, 2013, pp. 1-32.

PCT International Search Report and Written Opinion for PCT Application No. PCT/US2015/044822, dated Nov. 17, 2015.

Mayordomo, I., et al., "Wireless Power Transfer for Sensors and Systems Embedded in Fiber Composites", Fraunhofer Inst. for Integrated Circuits Iis, Nuremberg, Germany.

Zangl, H., et al., "Wireless Communication and Power Supply Strategy for Sensor Applications Within Closed Metal Walls", Inst. of Electr. Meas. & Meas. Signal Process, Graz Univ. of Tech., Graz, AU.

* cited by examiner

DEVICE FOR PROVIDING WIRELESS ENERGY TRANSFER

RELATED APPLICATIONS

This application is a divisional of U.S. patent application Ser. No. 15/517,758, filed Apr. 4, 2017, which is a U.S. National Stage Application of PCT/US2015/044822 filed Aug. 12, 2015, which claims the benefit of and priority to U.S. Provisional Patent Application No. 62/061,905 filed Oct. 9, 2014. The contents of all applications are incorporated herein by reference in their entirety.

BACKGROUND OF THE INVENTION

1. Field of the Invention

The present disclosure relates to wireless energy transmission and other applications.

2. Description of Related Art

Many electronic devices are battery dependent, which limits the capability and longevity of the device. Batteries must be replaced which increases the risk of nonuse as users may forget or often procrastinate. Battery power limits electronics to low power applications which limits the capabilities of the battery powered devices. Battery powered wireless sensors are required to be in close proximity to the mains (wall, generator, inverter, etc.) powered base station as communication range is limited for battery powered devices. Mains powered base stations restricts the location of the sensor to be in close proximity to the mains power. Mains power may be installed nearly anywhere, however, installing mains power conduit, junction boxes, outlets, etc. can be expensive and further, placing a sensor and a mains powered base station in the most preferable location may create unwanted exposure of wires and junction boxes which can distract from the aesthetics of a space. Mains powered base stations may have battery backup, but battery size limits the available power and duration over which the base stations may continue to operate before all battery energy is expended.

Such conventional methods and systems have generally been considered satisfactory for their intended purpose. However, there is still a need in the art for improved system and sensor capabilities and duration of operation following mains power failure, flexibility of system installation independent of where mains power is available and improved communication and sensing capabilities of security system sensors and base stations made possible by wireless energy transfer devices. The present disclosure provides a solution for this need.

SUMMARY OF THE INVENTION

A system for providing wireless power transfer for a security and access control system includes a primary antenna having a primary lens surrounding the primary antenna and a secondary antenna having a secondary lens surrounding the secondary antenna. The secondary antenna is operatively connected to power at least one sensor. A mains power source (e.g. wall, generator, inverter, etc.) is operatively connected to power the primary antenna. The primary and secondary antennas are separated a distance apart to wirelessly transfer power from the primary antenna to the secondary antenna. The primary antenna can be an electromagnetic emitter of near-field and/or far-field electromagnetic emissions. The secondary antenna can be a receiver of near-field and/or far-field electromagnetic emissions.

The primary lens and secondary lens can be comprised of an array of resonators such that the primary and secondary lenses can force electromagnetic energy towards the opposing antenna. The lenses and antennas are designed to reduce or prevent self-cancellation of the electromagnetic fields. The secondary lens can be configured to receive an RF signal from the primary antenna.

A device for providing wireless power transfer is disclosed including a primary antenna having a first lens surrounding a first end portion thereof. The primary antenna can further include a second lens surrounding a second end portion of the primary antenna, e.g., without the need for the lenses surrounding a portion of the primary antenna between the first and second end portions of the lenses. The device can further include a secondary coil having a first lens surrounding a first portion of the secondary coil and a second lens surrounding a second end portion of the secondary coil.

The first end portion and the second end portion of the primary antenna can be directed towards the first end portion and second end portion of the secondary antenna. The first and second lenses of each of the primary and secondary antennas can be comprised of an array of resonators. The first end portion of the primary antenna may be directed to cover a large area of multiple secondary antennas. In such an application the transmit power from the primary antenna would be directed toward the first end portion of multiple secondary antennas. Likewise the second end portion of the primary antenna may be directed to cover a large area of multiple secondary antennas. The lenses of the secondary antennas would be directed towards the primary antenna as described above.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
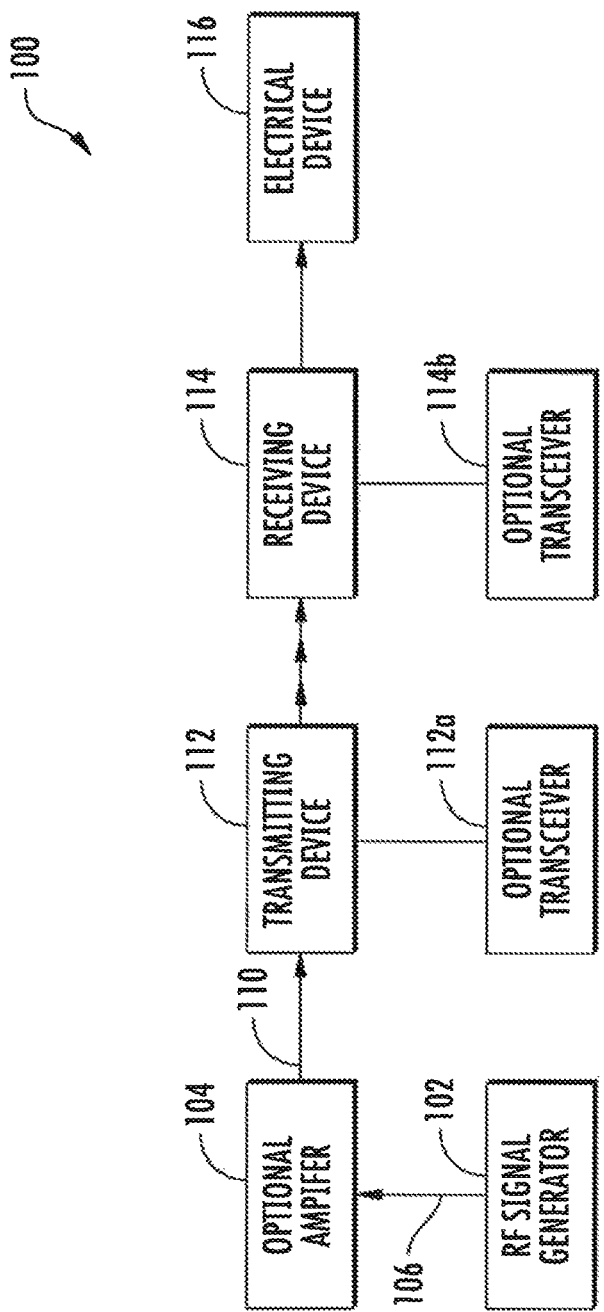
FIG. 1 is a block diagram of an exemplary embodiment of a wireless energy transfer system constructed in accordance with the present disclosure, showing transmitter and receiver devices as used within the system.

Reference will now be made to the drawings wherein like reference numerals identify similar structural features or aspects of the subject disclosure. For purposes of explanation and illustration, and not limitation, a partial view of an exemplary embodiment of a system of wireless power transfer in accordance with the disclosure is shown in FIG. 1 and is designated generally by reference character 100. Other embodiments of the system and device for wireless power transfer in accordance with the disclosure, or aspects thereof, are provided in FIGS. 2-7, as will be described.

As those skilled in the art will recognize, important considerations for resonator-based power transfer using near-field energy include resonator efficiency and resonator coupling. Extensive discussion of such issues, is provided, for example, in U.S. patent application Ser. No. 13/276,754 published on Nov. 1, 2012 as US 2012/0274147 and entitled "WIRELESS ENERGY TRANSMISSION USING NEAR-FIELD ENERGY," which is incorporated herein by reference in its entirety as if fully set forth herein.

FIG. 1 is a block diagram of a wireless energy transfer system 100 according to the present disclosure. The wireless energy transfer system 100 allows energy for use in providing power and/or data communications to be transferred wirelessly from a source (e.g., a mains power source) to a load (e.g., an electrical device) based on the concept of nonradiative near fields of resonators (referred to as nonradiative resonant coupling). In particular, the wireless energy transfer system 100 is implemented using primarily near-field energy.

With continued reference to FIG. 1, the system 100 includes an RE signal generator 102 operatively coupled to an optional power amplifier 104. The RE signal generator is the source of energy and can be a mains powered energy source or the like. The RF signal generator 102 generates an RE energy signal 106, which is (optionally) amplified by a power amplifier 104 to produce an amplified RF energy signal 110. RF Signal generator 102 may generate a full wave rectified signal, sinusoid or combination of full wave rectified and sinusoids. Further, the signal from the RF signal generator 102 may or may not be modulated for carrying data. The system further includes an electromagnetic transmitter device 112 for wireless transferring of the RF energy signal. An electromagnetic receiver device 114 is separated a distance apart from the transmitter device 112 and acts to receive the RF energy signal. Each of the transmitting device and receiving device 112 and 124 may be operatively connected to optional transceivers 112*a* and 114*a* for allowing the transfer of data. Each of the transmitting device and the receiving device 112 and 114 includes a low frequency near-field RE lens (described in greater detail below with respect to FIG. 2) to transmit and receive the near-field RE signal. The lens of the receiver device converts the near-field RF energy to either a direct or alternating electrical current which is then directed into the load 116 or more specifically an electrical device, such as a sensor. The system of FIG. 1 could also be used to wirelessly communicate data between primary and secondary devices. The data may be used for communication, radar or other purposes.

Figure 2:
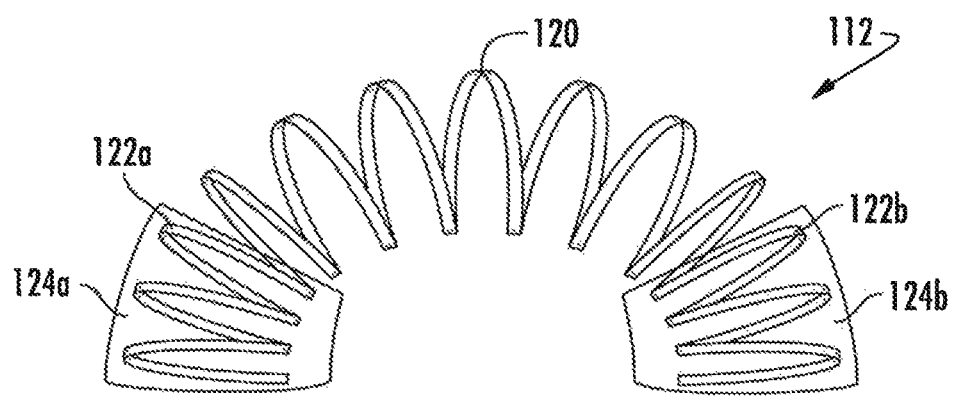
FIG. 2 is a top schematic view of a transmitter and receiver device of FIG. 1, showing an antenna and first and second lenses.
Figure 7:
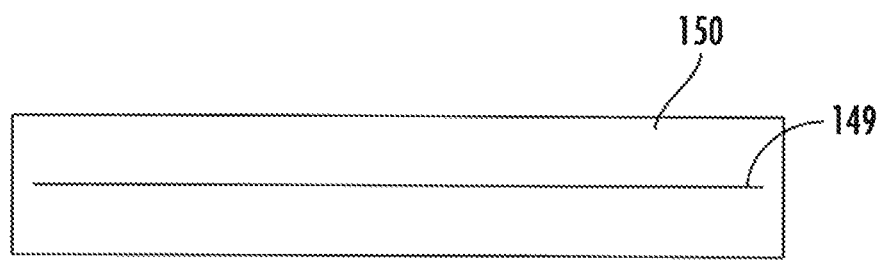
FIG. 7 is a top schematic view of another embodiment of the antenna of the transmitter and receiver devices, showing a straight line antenna and lens.

FIG. 2 is a top view of an exemplary transmitter and receiver device as used in system 100. The devices include an antenna 120 which may be a loop-type with many turns for creating high electromagnetic field versus current characteristics. Antenna 120 is configured in a partial toroidal helix shape to be substantially non-resonant such that far-field signals, i.e., radiated field signals, are minimized and near-field signals are maximized. In other example configurations any other suitable shape besides partial toroidal helix may be desirable and are considered within the scope of the present disclosure. As shown in FIG. 2, the antenna 120 has a first and second lens 124*a*, 124*b*. Each of the first and second lenses 124*a*, 124*b* are positioned at first and second end portions 122*a*, 122*b*, respectively, of the antenna with no other lenses or antennas therebetween. More specifically, the lenses 124*a*, 124*b* surround the first and second end portions 122*a*, 122*b* of antenna 120. The lenses 124*a*, 124*b* are comprised of an array of resonators. The lenses 124*a*, 124*b* force electromagnetic energy towards the opposing antenna by reducing or preventing self-cancellation of the near-field, as shown in FIG. 7. Since a significant portion of the near-field energy appears at the first and second end portions (i.e., the mouths) 122*a*, 122*b* of the antenna 120, the lenses 124*a*, 124*b* reduce the amount of electromagnetic energy from the antenna 120 from closing/self-cancelling immediately at the two mouths of the antenna 120. The lenses 124*a*, 124*b* positioned at the end portions 122*a*, 122*b* of the antenna 120 have a tighter tolerance than a lens distributed over the entirety of the antenna 120. For the configuration shown in FIG. 2, a substantial portion of the antenna 120 is not controlled by either lens 124*a*, 124*b*. Therefore, the electromagnetic fields in the uncontrolled region are directed towards one mouth of the antenna 120 on the inside of the antenna 120 and the other mouth of antenna 120 on the outside of antenna 120.

Figure 3:
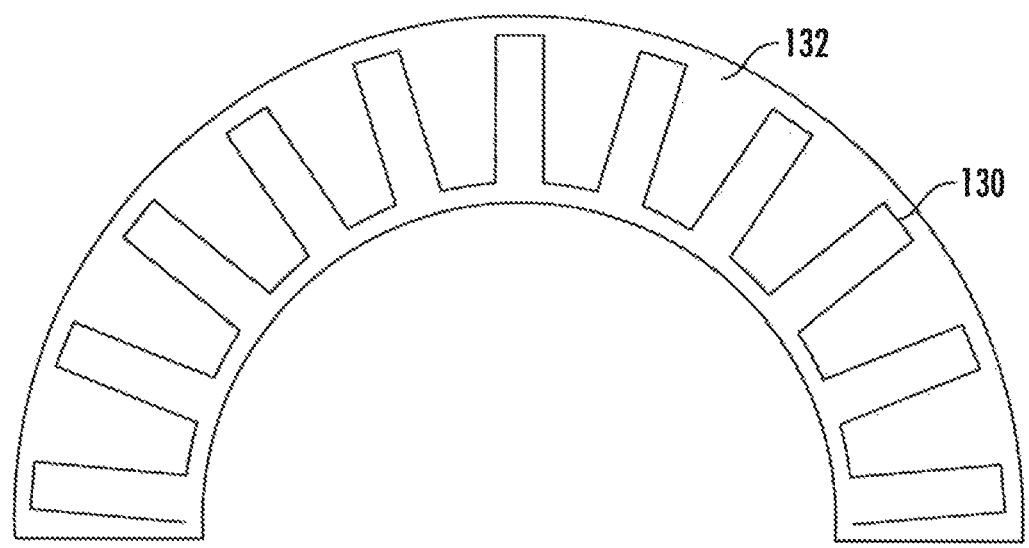
FIG. 3 is a top schematic view of another embodiment of the antenna of the transmitter and receiver devices, showing a meander line configuration and lens.
Figure 4:
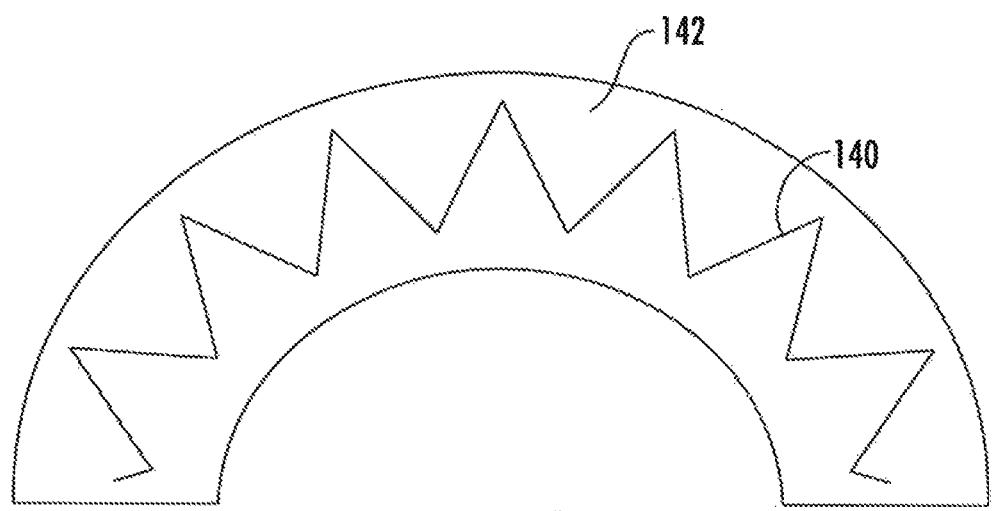
FIG. 4 is a top schematic view of another embodiment of the antenna of the transmitter and receiver devices, showing a meander line configuration having triangular peaks and lens.

FIGS. 3-4 and 7 illustrate top views of other embodiments of antennas 130, 140, 149 for use as transmitter and receiver devices 112, 114 in system 100. Antenna 130 is configured as a meander line antenna, antenna 140 is configured as a meander line antenna with triangular peaks, and antenna 149 is a linear antenna. Unlike antenna 120, meander line antenna 130, meander line antenna with triangular peaks 140, and linear antenna 149 include lenses 132, 142, 150 respectively, which cover the entirety of the antennas 130, 140, 149. The meander line antenna 130, the triangle antenna 140, and the linear antenna 149 allow for directing energy on the back/far side of the lens/antenna towards another lens/antenna. The energy on the back/far side of the lens/antenna, in varying configurations, cannot be directly pointed towards another lens/antenna because the antenna and associated lens are in the way. The uniform geometry of the meander line antenna 130, the triangle antenna 140, and the linear antenna 149 simplify the lens design. The uniform geometry results in simplified spacing between the lens elements and minimizes impediments to view of an opposing antenna which allows for less current/field cancellation, resulting in a design which has higher efficiency, is easier to design, lower cost, and easier to manufacture.

Figure 5:
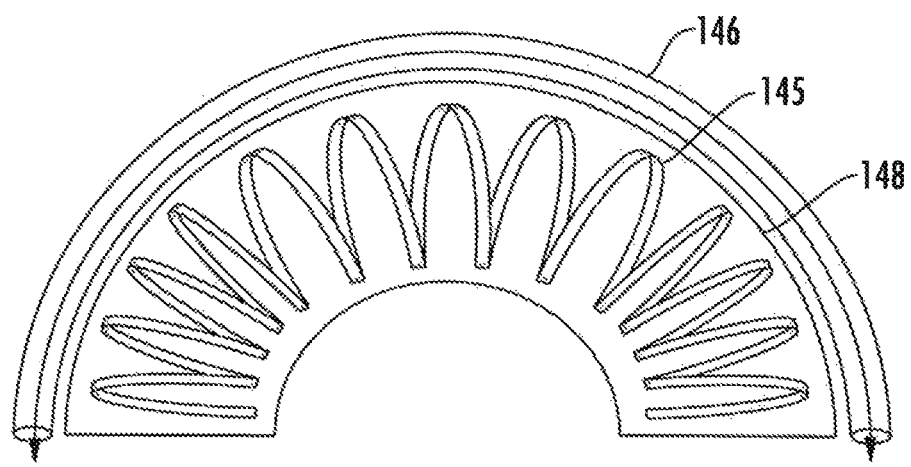
FIG. 5 is a top schematic view of another embodiment of the antenna of the transmitter and receiver devices, showing light pipes on a back side of the antenna.
Figure 6:
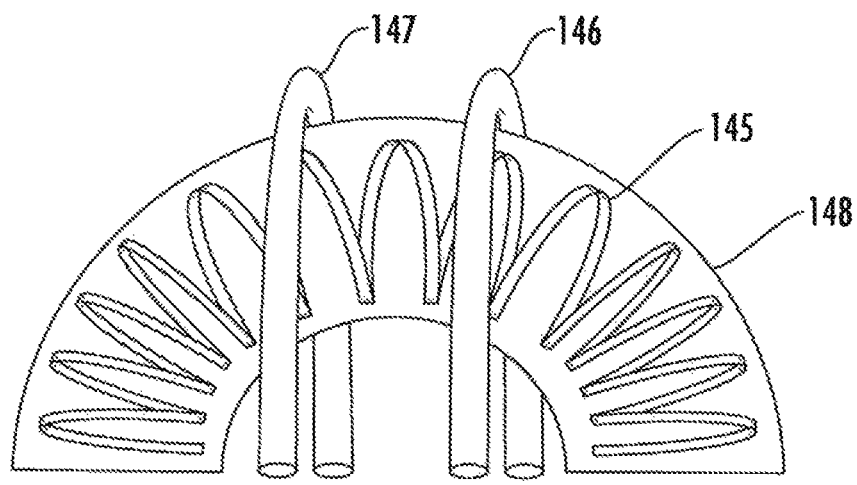
FIG. 6 is a top schematic view of another embodiment of the antenna of the transmitter and receiver devices, showing a plurality of light pipes.

One way to utilize the energy from the back/far side of the lens/antenna is via a longer lens element, for example, a light pipe, which transports the energy to a point where the energy has an unobstructed view of the opposing antenna. FIGS. 5 and 6 illustrate yet another embodiment of an antenna 145 in a partial toroidal helix shape that may be used with transmitter and receiver devices 112, 114. In FIG. 5, antenna 145 is surrounded in its entirety by lens 148. Light pipe 146 is positioned on a back side of antenna 145. The energy from the back side of the antenna 145 is directed through the light pipes 146, 148, respectively, towards an opposing antenna. In FIG. 6, a plurality of light pipes 146 and 147 are positioned arching over the back side of the antenna 145. In this configuration, the light pipes 146 and 147 create a shorter and efficient path for the transfer of energy. In other words, the energy may be transported to a convenient position by adding layers to the lens which gradually move the energy away from and to the side or top of the lens. Light pipes 146, 147 direct electromagnetic energy from the back side of the antenna and lens which has an obstructed view (from an electromagnetic perspective) of the target antenna and lens. The light pipes are low-loss and low-cancellation subwavelength sized resonators used to direct electromagnetic energy similar to the lens material.

Figure 8:
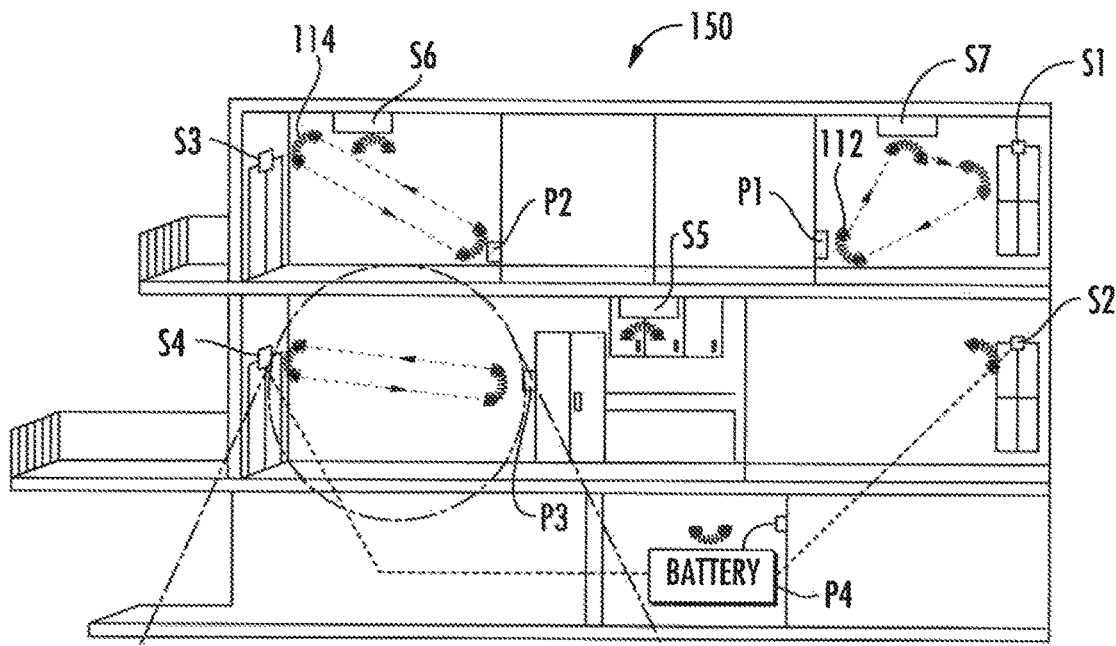
FIG. 8 is a schematic view of an exemplary security system using the transmitter and receiver devices of FIG. 2 to wirelessly transfer power therebetween.
Figure 9:
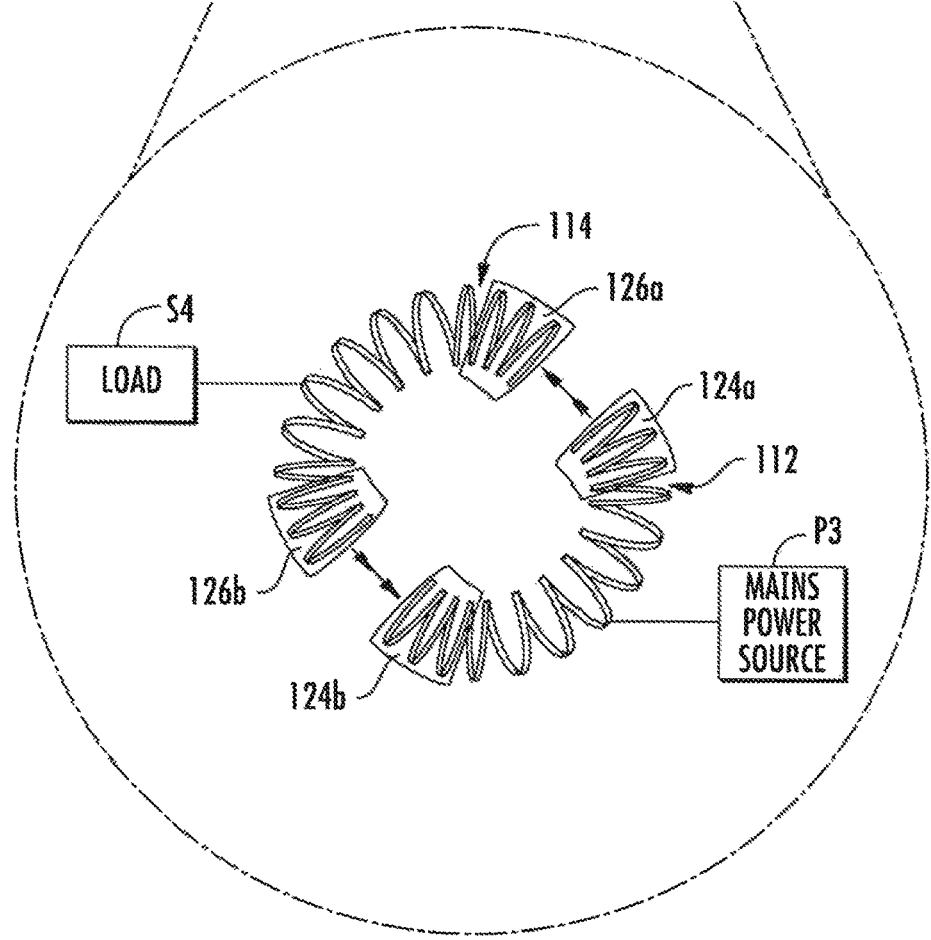
FIG. 9 is a detailed view of the transmitter and receiver devices as part of the security system of FIG. 8.

FIG. 8 is an example of a wireless system 150 using the transmitter and receiver devices 112, 114 of FIGS. 2, 3, 4, 5, 6 and/or 7 and system of FIG. 1. It will be understood by those skilled in the art that this a security system as shown and described below is one example for the use of the devices, however, any system having electric or electronic devices requiring wireless energy power transfer is contemplated without departing from the scope of the invention. Shown in FIG. 8 is a multi-level structure having several doors, windows and a kitchen. The security system includes a plurality of sensors. Sensors can be of types commercially available and known in the art. For example, sensors S1, S2, S3, S4 can be positioned at each window and door and used by the security system to notify occupants if a window or door is left open. Sensors S5, S6, S7 can be smoke/fire alarms positioned in the kitchen and bedrooms. Each of the sensors S1, S2, S3, S4, S5, S6 and S7 may be wirelessly powered or battery powered electronic devices. Mains power sources P1, P2, P3, P4 are locating throughout the home. A respective transmitter device 112 is operatively connected to each wall power source P1, P2, P3, P4 and a respective receiver device 114 is operatively connected to each sensor S1, S2, S3, S4, S5, S6 and S7. The respective transmitter device 112 can be separated a distance apart from the respective receiver device so as not to interfere with the design and aesthetics of the space. As shown, a transmitter device may transfer energy to more than one receiver device and therefore more than one sensor. For example, wall power source P1 is transmitting energy to sensors S1 and S7 and power source P4 provides backup power to the entire system from a source of a bank of car batteries in the basement. FIG. 9 shows a detailed view of the transmitter device 112 connected to mains power source P3 and receiver device 114 connected to sensor/load S4. In operation, as shown schematically in FIG. 1, the transmitter device 112 receives the amplified RE energy signal from the wall power source P3 and the amplifier 104. In response thereto, the transmitter device 112 causes RF energy to be wirelessly transmitted between the transmitter device 112 and the receiver device 114. First and second lenses 124*a*, 124*b* of the transmitter device 112 are directed towards the first and second lenses 126*a*, 126*b* of the receiver device 114 to direct the transfer of energy. The first and second lenses 126*a*, 126*b* of the receiver device 114 convert the electromagnetic fields to an electrical signal, which is received by the sensor S4. In this manner near-field energy is wirelessly transferred to provide power to an electrical or electronic device. Power may be transmitted continuously or in a periodic manner. Low frequency electromagnetic energy penetrates most materials well except metal. Advantageously, the system can even be used to provide power through a metal barrier/wall, but the efficiency will be reduced as the metal wall will absorb, reflect and defocus the fields as they pass through the metal, particularly good conductors of magnetic fields such as iron. Of course, it should be appreciated that at a particular frequency of operation there will be a metal wall thickness beyond which no appreciable energy will be transmitted. In such a situation, a wireless power transmitter on the other side of the metal barrier or mains power needs to be provided.

In addition to uses described above, the lenses may be used to relay data wirelessly between sensors, base stations and/or act as a redundant communication backup for the base station. The very high directivity of the lenses, non-radiative nature of the lenses (e.g. far-field cancelling), low path loss in most instances and very high bit energy of emissions make communication interference quite robust and reduces susceptibility to interference.

In addition to the uses described above, the lenses may be used as part of a Multiple-Input-Multiple-Output (MIMO) or tomography radar used to detect and track objects and people in the area under protection of the security system. Such a radar would characterize the surroundings by the power emissions and/or communication emissions and/or by passively sensing the electromagnetic emissions not under the control of the security or wireless power system.

As described above, this disclosure relates to wireless energy transfer using electromagnetic resonators. However, such energy transfer is not restricted to one electromagnetic resonator type, and those skilled in the art will readily appreciate the wireless energy transfer systems described herein are more general and may be implemented using a wide variety of resonators and resonant objects.

The methods and systems of the present disclosure, as described above and shown in the drawings, provide for a system and device for energy transfer with superior properties including improved wireless energy transfer using near-field energy. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A system for monitoring one or more rooms of a structure to provide security and access to the structure, the system comprising:
 a wireless system configured to be installed within a structure, the wireless system including:
 a sensor configured to be placed at a first location within the structure to monitor at least a portion of the structure, the first sensor including a receiver portion operatively connected thereto configured to wirelessly receive energy transmission from a transmitter,
 the receiver having a first antenna with a lens surrounding the first antenna, and the transmitter configured to be placed at a second location within the structure, the second location different than the first location and separated by a distance from the first location configured to wirelessly transmit the energy transmission to the receiver of the sensor, the transmitter having a second antenna with a second lens surrounding the second antenna; and a main power source operatively connected to the transmitter, to wirelessly transfer power from transmitter to the receiver to wirelessly power the sensor with the main power source, wherein the energy transmission includes at least the power;

wherein the sensor is configured to be positioned at a window and/or a door of the structure to monitor an open/close status of the window and/or door and wirelessly communicate the open/close status of the window and/or the door to a user;

wherein the sensor is a first sensor and further comprising a second sensor, wherein the second sensor is configured to be placed within the structure at a third location different than the first location and the second location and separated by a distance from the first location and the second location to monitor at least a portion of the structure, wherein the second sensor includes a receiver portion operatively connected thereto configured to wirelessly receive the energy transmission from the transmitter, the receiver having a third antenna with a third surrounding the third antenna wherein the energy transmission includes at least the power such that the second sensor is wirelessly powered by the main power source, wherein the second sensor is configured to detect smoke and/or fire within the structure and wirelessly communicate the presence of smoke or fire within the structure to the user.

2. The system of claim 1, wherein the first antenna is an electromagnetic receiver.

3. The system of claim 1, wherein the second antenna is an electromagnetic transmitter.

4. The system of claim 1, wherein the first lens and the second lens is comprised of an array of resonators.

5. The system of claim 1, wherein the first and second antennas are meander line antennas.

6. The system of claim 1, wherein the energy transmission further includes data communication transmission, and further comprising a first transceiver operatively connected to the first antenna and a second transceiver operatively connected to the second antenna, the first and second transceivers configured to communicate the data between the first and second antennas.

7. The system of claim 1, wherein the at least one room includes a plurality of rooms spaced throughout and on multiple floors of the structure, each room including a respective wireless system.

8. The system of claim 1, wherein the first antenna and the first lens direct electromagnetic energy towards the second antenna and the second lens in a manner which prevents field self-cancellation.

9. The system of claim 1, wherein the sensor is configured to be wirelessly powered and battery powered, wherein the first sensor is configured to be operatively connected to a battery bank to receive power from the battery bank during a main power source failure.

10. A system for monitoring one or more rooms of a structure, to provide security and access to the structure, the system comprising: a plurality of wireless systems configured to be installed within a plurality of rooms of a structure, wherein each room of the structure is monitored by a respective wireless system, wherein each wireless system includes: a sensor configured to be placed at a first location within the structure to monitor at least a portion of the structure, the first sensor including a receiver portion operatively connected thereto configured to wirelessly receive energy transmission from a transmitter, the receiver having a first antenna with a lens surrounding the first antenna; and the transmitter configured to be placed at a second location within the structure, the second location different than the first location and separated by a distance from the first location configured to wirelessly transmit the energy transmission to the receiver of the sensor, the transmitter having a second antenna with a second lens surrounding the second antenna; and a main power source operatively connected to the transmitter to wirelessly transfer power from transmitter to the receiver to wirelessly power the sensor with the main power source, wherein the energy transmission includes at least the power, wherein the first antenna and the first lens direct electromagnetic energy towards the second antenna and the second lens in a manner which prevents field self-cancellation;

wherein the sensor is configured to be positioned at a window and/or a door of the structure to monitor an open/close status of the window and/or door and wirelessly communicate the open/close status of the window and/or the door to a user;

wherein the sensor is a first sensor and further comprising a second sensor, wherein the second sensor is configured to be placed within the structure at a third location different than the first location and the second location and separated by a distance from the first location and the second location to monitor at least a portion of the structure, wherein the second sensor includes a receiver portion operatively connected thereto configured to wirelessly receive the energy transmission from the transmitter, the receiver having a third antenna with a third surrounding the third antenna wherein the energy transmission includes at least the power such that the second sensor is wirelessly powered by the main power source, wherein the second sensor is configured to detect smoke and/or fire within the structure and wirelessly communicate the presence of smoke or fire within the structure to the user.

\* \* \* \* \*